(12) United States Patent
Menezes et al.

(10) Patent No.: US 8,902,558 B2
(45) Date of Patent: *Dec. 2, 2014

(54) CONTROL DEVICE FOR CONTROLLING A CIRCUIT BREAKER, AND METHODS

(75) Inventors: Joseph Menezes, Vasteras (SE); Soren Forsman, Vasteras (SE)

(73) Assignee: ABB Technology AG (CH)

( * ) Notice: Subject to any disclaimer, the term of this patent is extended or adjusted under 35 U.S.C. 154(b) by 0 days.

This patent is subject to a terminal disclaimer.

(21) Appl. No.: 14/002,905

(22) PCT Filed: Mar. 3, 2011

(86) PCT No.: PCT/EP2011/053158
§ 371 (c)(1),
(2), (4) Date: Sep. 3, 2013

(87) PCT Pub. No.: WO2012/116748
PCT Pub. Date: Sep. 7, 2012

(65) Prior Publication Data
US 2014/0002944 A1    Jan. 2, 2014

(51) Int. Cl.
*H01H 71/74* (2006.01)
*H01H 47/22* (2006.01)
*H02H 3/02* (2006.01)

(52) U.S. Cl.
CPC ............... *H01H 47/22* (2013.01); *H02H 3/021* (2013.01)
USPC .......................................................... 361/115

(58) Field of Classification Search
USPC .................................... 361/66, 115
See application file for complete search history.

(56) References Cited

U.S. PATENT DOCUMENTS

| | | | |
|---|---|---|---|
| 3,265,933 A | | 8/1966 | Perry et al. |
| 6,018,451 A | * | 1/2000 | Lyke et al. .................. 361/93.2 |
| 7,480,580 B2 | | 1/2009 | Zweigle et al. |
| 7,630,863 B2 | | 12/2009 | Zweigle et al. |
| 7,698,582 B2 | | 4/2010 | Qin et al. |
| 8,084,891 B2 | * | 12/2011 | Poeltl et al. .................... 307/125 |
| 8,649,147 B2 | * | 2/2014 | Schlotterer et al. ........... 361/115 |
| 2009/0073627 A1 | | 3/2009 | Poeltl et al. |
| 2012/0023058 A1 | * | 1/2012 | Mohagheghi et al. .......... 706/52 |
| 2013/0215556 A1 | * | 8/2013 | Bjorklund ...................... 361/622 |
| 2014/0002944 A1 | * | 1/2014 | Menezes et al. ............... 361/160 |
| 2014/0025321 A1 | * | 1/2014 | Spanier .......................... 702/62 |

FOREIGN PATENT DOCUMENTS

EP     0957555 A2    11/1999
WO    2011059540 A1    5/2011

OTHER PUBLICATIONS

International Search Report and Written Opinion of the International Searching Authority Application No. PCT/EP2011/053158 Completed: Jun. 27, 2012; Mailing Date: Jul. 4, 2012 9 pages.
International Preliminary Report on Patentability & Written Opinion of the International Searching Authority Application No. PCT/EP2011053158 Issued: Sep. 3, 2013 7 pages.

* cited by examiner

*Primary Examiner* — Ronald W Leja
(74) *Attorney, Agent, or Firm* — St. Onge Steward Johnston & Reens LLC

(57) ABSTRACT

A control device for controlling a circuit breaker. The control device includes a central processing unit and is arranged to communicate with an output module arranged to output operational commands to the circuit breaker. The output module includes processing means arranged to execute an operational command at a point of time received from the central processing unit. The invention also encompasses related methods.

13 Claims, 2 Drawing Sheets

CONTROL DEVICE FOR CONTROLLING A CIRCUIT BREAKER, AND METHODS

FIELD OF THE INVENTION

The invention relates generally to the field of protection and control of equipment of electrical power systems, and in particular to control devices and methods therefore.

BACKGROUND OF THE INVENTION

Intelligent electronic devices (IEDs) are devices that are used for protection, control and monitoring of a power system network. The IED receives data from sensors and power equipment, and can issue control commands, such as tripping commands for opening e.g. circuit breakers, contactors or contact switches if they detect voltage, current, or frequency anomalies, or can effectuate a close command for closing circuit breaker or raising/lowering voltage levels in order to maintain a desired level.

The IED executes specific application functions on a platform which comprises hardware and firmware. The hardware platform typically comprises an analog handling part, for example transformer modules or A/D conversion, and provides input presented to a main Central Processing Unit/ Digital Signal Processor (CPU/DSP) for processing. The main CPU/DSP is where the application functions are executed in the run-time environment. Binary status data from the power system network is transferred via binary input modules to the CPU/DSP for processing and logical computation. The commands to the process, for example a process such as opening and closing of a circuit breaker, are performed via binary output modules. All input/output modules either of analog or Boolean type communicates with the main CPU/DSP via a communication backplane or an external field/process bus. In addition, the IED can support a local machine interface screen, communication ports and time synchronization ports.

Controlled switching, or point-of-wave switching, of the circuit breakers is highly desirable in the power system network. Transient disturbances in power systems may damage equipment of the power system, and such voltage and current transients may be introduced during normal switching operations, e.g. during opening/closing operations of the circuit breaker. By means of a controlled switching of the circuit breaker, the harmful transients can be highly reduced. One of the most common applications for controlled switching of circuit breakers is in Shunt Capacitor Banks (SCB), during which high magnitude and high frequency transients can occur. Other application examples comprise Reactor Banks and Power Transformer bays.

In the controlled switching, sensors such as voltage transformers are used for measuring voltages at both sides of the circuit breaker and/or a sensor such as current transformer is used for measuring the current through the circuit breaker. In algorithms used for determining when to close the circuit breaker, parameters such as voltage difference, frequency difference and phase difference between the both sides of the current breaker are used. In the case when to open the circuit breaker, the conditions and algorithm can be different from the ones used for closing the circuit breaker. Algorithms for calculating such synchronization are known.

The implementation of point-on-wave switching comprises well-known algorithms for determining the best point for switching. In some applications, but not necessarily for all kinds of applications, a zero-current crossing is optimal, providing the least amount of current for the current breaker to break, thus providing the safest possible breaking and further e.g. minimizing wear on contactors of the circuit breaker and other damage to the electric power system or equipment.

However, to actually effectuate the switching at the desired switching point can be difficult, even when suitable algorithms for calculating it are used. One difficulty is various types of time delays. An example of such time delay is the operating time of the circuit breaker, i.e. the time for the circuit breaker to actually close (time from energizing a closing coil until contacts close), which for example could be some milliseconds. The CPU/DSP of the IED can be arranged to compensate for this circuit breaker operating time as the operating times are generally well known.

Still, there may be further delays introduced in the IED. As another example, when the CPU/DSP of the IED transmits a trip signal to the output module, this communication is conveyed in the earlier mentioned communication backplane or external field/process bus. Delays may be introduced in this communication backplane or external field/process bus, and the output module thus outputs the trip signal later than intended and the circuit breaker is tripped at another point of time than the intended.

From the above, it is clear that there is a need for an improvement on this situation in this field of technology.

SUMMARY OF THE INVENTION

It is an object of the invention to overcome or at least alleviate the above mentioned drawback. In particular, it is an object of the invention to provide an improved accuracy of operational commands sent from a control device such as an intelligent electronic device.

The object is according to one aspect achieved by a control device for controlling a circuit breaker. The control device comprises a central processing unit which is arrange to communicate with an output module. The output module is arranged to output operational commands to the circuit breaker. The output module comprises processing means arranged to execute an operational command at a point of time received from the central processing unit. By means of the invention a much improved accuracy of operational commands can be obtained. Commands can be sent from the control device with a high accuracy, which in turn entails an improved safety and protection of equipment in the electrical power system. The switching, e.g. point-on-wave switching, is independent of the control device internal time and also of the message transfer time from the central processing unit to the output module.

In an embodiment, the point of time comprises an absolute time in a time-domain internal to the control device.

In an embodiment, the point of time is independent of a message transfer time over a communication backplane or field/process bus from the central processing unit to the output module.

In an embodiment, the central processing unit is arranged to process an input analog signal waveform and commands for circuit breaker open or close; to compensate for a settable open or close angle of the waveform and for circuit breaker operating time; and to transfer, based on the processing and compensating, a point of time from the central processing unit to the output module at which an operational command is to be transmitted by the output module to the circuit breaker.

In an embodiment, the control device is further arranged to communicate with an input module. The input module is arranged to receive measurements from equipment, such as a current transformer and/or voltage transformer, within an electrical power system in which the circuit breaker is arranged.

In an embodiment, the input module is an analog input module and the control device further comprises an analog-to-digital converter arranged to receive analog data from the input module, to convert the analog data to digital data proportional to the analog data, and to output digital data to the central processing unit.

In an embodiment, the control device further comprises a binary input module arranged to receive binary status data from the circuit breaker.

In an embodiment, the central processing unit and the output module are synchronized.

In an embodiment, the operational command comprises an open command or a close command to the circuit breaker controlled by the control device.

In an embodiment, the processing means of the output module comprises a microcontroller or a Field-programmable Gate Array.

In an embodiment, the central processing unit and the output module communicate over a communication backplane or external field/process bus. The output module may be part of the control device, or remotely located therefrom. Depending on arrangement, the communication between the modules may be arranged to be performed over an internal communication backplane or over an external field/process bus. A flexible solution is thus provided, suitable for remote input/output devices as well as local input/output devices.

The object is according to a second aspect achieved by a method in a control device for controlling a circuit breaker, the control device comprising a central processing unit and being arranged to communicate with an output module. The output module is arranged to output operational commands to the circuit breaker. The method comprises: processing an analog signal waveform and commands for circuit breaker open or close; compensating for a settable open or close angle of the waveform and for circuit breaker operating time; and transferring, based on the processing and compensating, a point of time from the central processing unit to the output module at which an operational command is to be transmitted by the output module to the circuit breaker. Advantages corresponding to the earlier described advantages for the control device are obtained.

In an embodiment, the processing of the analog signal waveform comprises converting the analog signal waveform from a frequency domain to an internal time domain that is known to the CPU and the output module.

Further features and advantages thereof will become clear upon reading the following description and the accompanying drawings.

DETAILED DESCRIPTION OF EMBODIMENTS

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary detail. Like numbers refer to like elements throughout the description.

Figure 1:
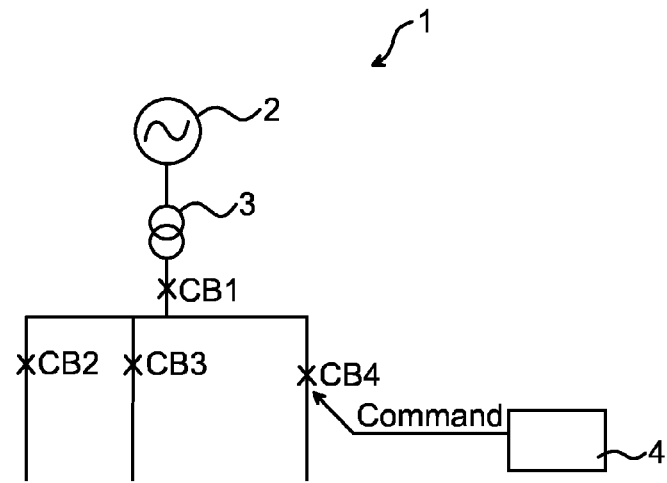
FIG. 1 illustrates schematically an environment in which embodiments of the invention may be implemented.

FIG. 1 illustrates schematically an environment in which embodiments of the invention may be implemented. In particular, FIG. 1 illustrates schematically an electrical power system 1 comprising a number of circuit breakers CB1, CB2, CB3, CB4 arranged for protecting equipment of the electrical power system 1. Such equipment may for example comprise generators 2, transformers 3, transmission lines or distribution lines. Each such equipment or part of the electrical power system 1 may be arranged with one or more circuit breakers CB1, CB2, CB3, CB4. Respective control devices 4 (only one illustrated) output operational commands to the respective circuit breaker CB1, CB2, CB3, CB4. In the figure the control device 4 may for example output (illustrated by the arrow) operational commands such as closing or opening operations to the circuit breaker CB4.

Figure 2:
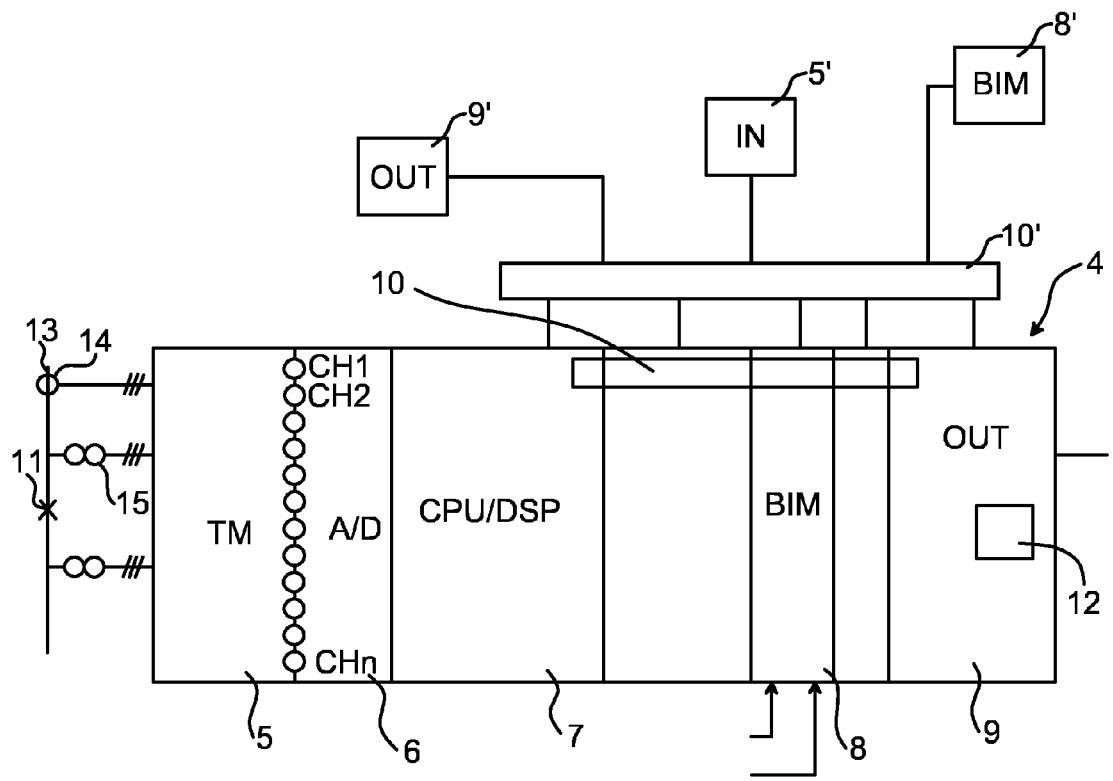
FIG. 2 illustrates a control device implementing embodiments of the invention.

FIG. 2 illustrates schematically the control device 4 in which embodiments of the invention may be implemented. The control device 4, e.g. an intelligent electronic device IED, is arranged to control, monitor and protect an equipment of or a part of the electrical power system 1. In FIG. 2, a transmission/distribution line 13 is arranged with a circuit breaker 11 and the control device 4 controls the circuit breaker 11, which can be tripped (opened) e.g. if a fault is detected on the transmission/distribution line 13. The circuit breaker 11 is thus connected in the transmission/distribution line 13. A current transformer 14 is arranged so as to measure the current through the circuit breaker 11, and voltage transformers 15 are typically arranged at both sides of the circuit breaker 11, as is mentioned in the background section.

Measurements from the current transformers 14 and voltage transformers 15 are input to the control device 4 and in particular to a transformer module 5 thereof. The transformer module 5 receives these analog values and outputs them to an analog to digital converter 6, by means of a number of channels CH1, CH2, ..., CHn.

The analog to digital converter 6 quantizes the time-varying signals received from the transformer module 5 by turning them into a sequence of digital samples. The result is quantized in both time and value in known manner.

The analog to digital converter 6 thus outputs digital values to a processing unit 7, e.g. central processing unit (CPU) and/or digital signal processor (DSP). In the following CPU 7 is used for denoting the processing unit of the control device 4, although the processing unit 7 could comprise a DSP or a combination of both. The CPU 7 may comprise a number of microprocessors. The CPU performs a number of calculations and algorithms, such as providing and obtaining sample values, root-mean-square (rms) values, real and imaginary phasor calculations, discrete Fourier transforms etc. The CPU 7 is where application functions are executed in the run-time environment.

Binary status data from the electrical power system 1 is transferred to the CPU 7 via a binary input module 8. The binary input module 8 may for example be arranged to receive binary input such as circuit breaker open/closed, disconnector position (open/close), local/remote control etc. All such data is transferred to the CPU 7 for processing and logical computation.

In an embodiment, the control device 4 further comprises an output module 9, which is arranged to transmit operational commands to the equipment of the electrical power system 1, for example the circuit breaker 11. The operational commands may for example comprise a close command or an open command.

In another embodiment the output module 9' is not a part of the control device 4. The output module 9' is then able to communicate with the CPU over a communication means, such as a field/process bus 10'. The field/process bus 10' is in such case external to the control device 4. For the embodiment wherein the control device 4 comprises the output module 9, the communication means, such as communication backplane 10 can be internal to the control device 4.

It is thus noted that the invention encompasses both local input/output (LIO) modules, meaning that the control device 4 comprises such input/output modules, and remote input/output (RIO) modules, meaning that such input/output modules are located elsewhere, and apart from the control device 4. In case of the RIO modules, the RIO modules communicate with the control device 4 over the external field/process bus 10'. The invention further encompasses mixtures of LIO and RIO arrangements. That is, the control device 4 may comprise one or more LIO(s) and also be communicating with one or more RIO(s).

In line with the above, the input module 8 need not be part of the control device 4, but can be a separate module located elsewhere. Additional external input modules 5' may also be communicating data to the control device 4 over the field/process bus 10'.

In case of a RIO arrangement, analog processing can be done by a remote unit and data can be sent over the field/process bus 10'. Further, the transformer module 5 and the analog to digital converter 6 can be omitted for a control device 4 adapting to such RIO arrangement.

In case of a RIO arrangement, the synchronization between the CPU 7 and output modules 9' comprises a mechanism equivalent to the case where the LIO arrangement is implemented. That is, the CPU 7 will synchronize also the remote IO modules 5', 8', 9'.

The communication between the different parts of the control device 4 is performed by means of the communication backplane 10 or external field/process bus 10'. The communication backplane 10 may for example comprise a CAN bus (Controller-area network) adapting to the message based protocols of the CAN standard.

The transfer time of a message from the CPU 7 to the output module 9, 9' over the communication backplane 10 or external field/process bus 10' is difficult to predict. Such delay is taken into consideration in the present invention, and problems related to such communication delay are overcome. In particular, such delay may cause a point-on-wave switching to be effectuated at a less than optimal point, which is detrimental e.g. to the electrical power system 1 as well as the service time of the circuit breaker 11.

The CPU 7 and the output modules 9, 9' are synchronized. The CPU 7 may act as a clock master and broadcast synchronization messages regularly, e.g. every second, in a specified format. External synchronization to real-time clock like GPS (Global Positioning System) clocks is not necessary since the power system waveform is equated to time that is used in accordance with the invention.

Figure 3:
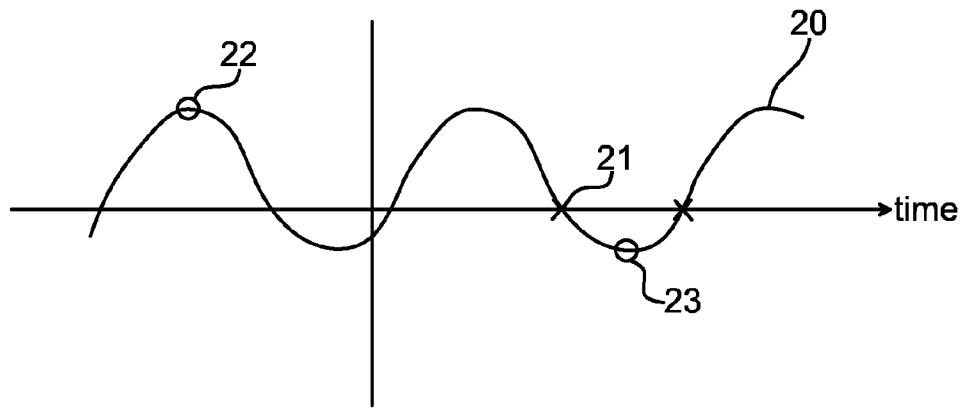
FIG. 3 illustrates a graph over a current waveform.

The actual controlled switching (point-on-wave-switching) functionality is executed on the CPU 7. Briefly, the point-on-wave-switching aims at operating the circuit breaker 11 at a specified point on the wave, e.g. a zero current crossing, in order to avoid or at least minimize arcing and harmful transients. With reference to FIG. 3, a current waveform 20 for a single phase is illustrated. The desired switching of the circuit breaker 11 at a given point on the waveform, e.g. at a zero current crossing (one of which is indicated at reference numeral 21) requires that consideration is taken to the circuit breaker operating time. In view of this, the CPU 7 compensates for the circuit breaker operating time in algorithms for enabling timely signaling an operational command (open/close) to the circuit breaker 11. If the operational command is sent at point 22 on the current waveform 20, the zero crossing 21 could be met. This is known and algorithms for compensating such delay are known. However, as explained earlier, also other delays exist, resulting in that the switching commands are still being sent too late and the switching e.g. being effectuated at point 23.

It is noted that the point-on-wave can be set suitably. The desire may be the zero-crossing, but can be other points as well, for example a point on the wave going down before the zero crossing is ideal for some applications.

Figure 4:
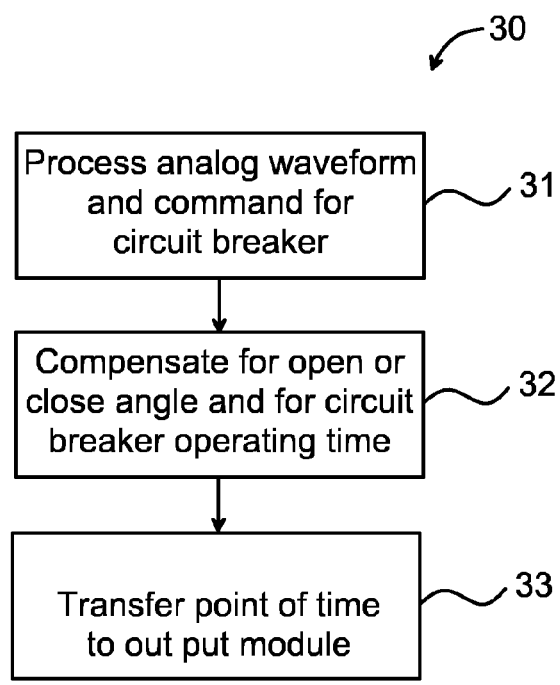
FIG. 4 illustrates a flow charts over steps of a method of an aspect of the invention.

In accordance with the invention, the effects of different delays are eliminated by having the CPU 7 calculate a point of time comprising an absolute time in a time-domain internal to the control device 4, which will be described more in detail in the following. With reference to FIG. 4, steps of a method performed in the control device 4, and in particular by the CPU 7, are illustrated.

The method 30 comprises a first step of processing 31 the analog signal waveform and the command for circuit breaker open or close. The analog signal waveform is converted from the frequency domain to an internal time domain that is known to the CPU 7 and the output module 9. The processing of the command for circuit breaker open or close comprises receiving input data indicating the need for circuit breaker operation.

The method 30 comprises a second step of compensating 32 for the settable open or close angle of the waveform and for the circuit breaker operating time. Since e.g. the circuit breakers or contactors have operating delays for opening/closing the contacts, these operating times are compensated for. Circuit breaker operating times are typically known and provided by manufacturers thereof.

The method 30 comprises a third step of transferring, based on the processing of the first step and the compensating of the second step, a point of time from the central processing unit 7 to the output module 9, 9' at which point of time an operational command is to be transmitted by the output module 9, 9' to the circuit breaker 11. The point of time may be provided using Epoch or some other system for describing points in time.

When all the above has been computed the CPU 7 sends the exact computed time to the output module 9, 9' as to when to send out the operational command, i.e. close or open as the case may be. The control device 4 internal time or the message transfer time from the CPU 7 to the output module 9, 9' are then not critical. However, the transfer time should be considered, e.g. estimated, so that the exact time that is computed by the CPU 7 for an operational command that is ahead in time, does not arrive to the output module 9, 9' too late.

The output module 9, 9' is provided with its own processing means 12 for executing based on the point of time received by the CPU 7, the closing or opening command to the circuit breaker 11. The processing means 12 may for example comprise a microcontroller or a Field-programmable gate array (FPGA). The output module 9, 9' is thereby able to execute a point-on-wave switching that is independent of the control device 4 internal time or the message transfer time from the CPU 7 to the output module 9, 9'. Therefore the closing or opening of the circuit breaker 11 is only dependent on the closing or opening time, which is computed and defined by the CPU 7.

A point-on-wave switching application function in the CPU 7 is connected to an output channel(s) of the output module 9, 9'. In contrast to the conventional way, wherein binary output channels connections are logical (Boolean) connections, in the present invention the connection will be a time connection, and notably the time to execute the command. Stated differently, in prior art, the CPU 7 outputs an open/close command to the output module 9, 9', which acts accordingly to output the command to the circuit breaker. In contrast, in accordance with the invention, the CPU 7 outputs a point of time to the added processing means 12 of the output module 9, 9'. The output module 9, 9' is thus able to effectuate the command at the point of time given to it. Effects of communication delays for communication over the communication backplane 10 or external field/process bus 10' are thus efficiently eliminated.

The invention claimed is:

1. A control device for controlling a circuit breaker, the control device comprising a central processing unit and arranged to communicate with an output module, the output module arranged to output operational commands to the circuit breaker, characterized in that the output module comprises processing means arranged to execute an operational command at a point of time received from the central processing unit.

2. The control device as claimed in claim 1, wherein the point of time comprises an absolute time in a time-domain internal to the control device.

3. The control device as claimed in claim 1, wherein the point of time is independent of a message transfer time over a communication backplane or external field/process bus from the central processing unit to the output module.

4. The control device as claimed in claim 1, wherein the central processing unit is arranged to process an input analog signal waveform and commands for circuit breaker open or close; to compensate for a settable open or close angle of the waveform and for circuit breaker operating time; and to transfer, based on the processing and compensating, a point of time from the central processing unit to the output module at which an operational command is to be transmitted by the output module to the circuit breaker.

5. The control device as claimed in claim 1, further arranged to communicate with an input module, the input module arranged to receive measurements from equipment, within an electrical power system in which the circuit breaker is arranged.

6. The control device as claimed in claim 4, wherein the input module is an analog input module and the control device further comprises an analog-to-digital converter arranged to receive analog data from the input module, to convert the analog data to digital data proportional to the analog data, and to output digital data to the central processing unit.

7. The control device as claimed in claim 1, further arranged to communicate with a binary input module, the binary input module arranged to receive binary status data from the circuit breaker.

8. The control device as claimed in claim 1, wherein the central processing unit and the output module are synchronized.

9. The control device as claimed in claim 1, wherein the operational command comprises an open command or a close command to the circuit breaker controlled by the control device.

10. The control device as claimed in claim 1, wherein the processing means of the output module comprises a microcontroller or a Field-programmable Gate Array.

11. The control device as claimed in claim 1, wherein the central processing unit and the output module communicate over a communication backplane or external field/process bus.

12. A method in a control device for controlling a circuit breaker, the control device comprising a central processing unit and arranged to communicate with an output module, the output module arranged to output operational commands to the circuit breaker, the method comprising:
 processing an analog signal waveform and commands for circuit breaker open or close,
 compensating for a settable open or close angle of the waveform and for circuit breaker operating time,
 transferring, based on the processing and compensating, a point of time from the central processing unit to the output module at which an operational command is to be transmitted by the output module to the circuit breaker.

13. The method as claimed in claim 12, wherein the processing of the analog signal waveform comprises converting the analog signal waveform from a frequency domain to an internal time domain that is known to the CPU and the output module.

* * * * *